No. 685,069. Patented Oct. 22, 1901.
J. E. VAN NOSTRAN.
COMBINED MOTOR AND CUSPIDOR.
(Application filed Dec. 3, 1900.)
(No Model.) 2 Sheets—Sheet 1.
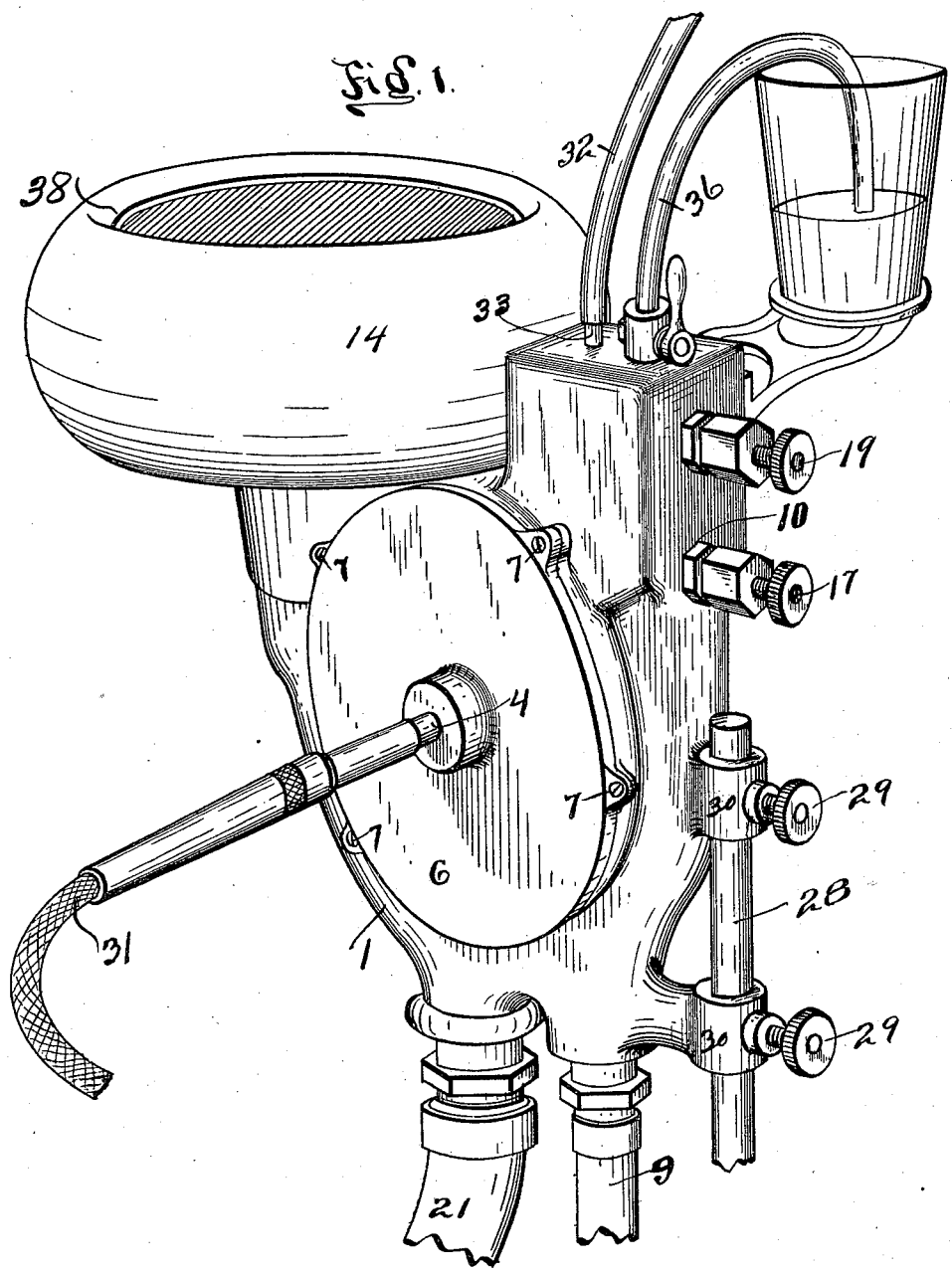

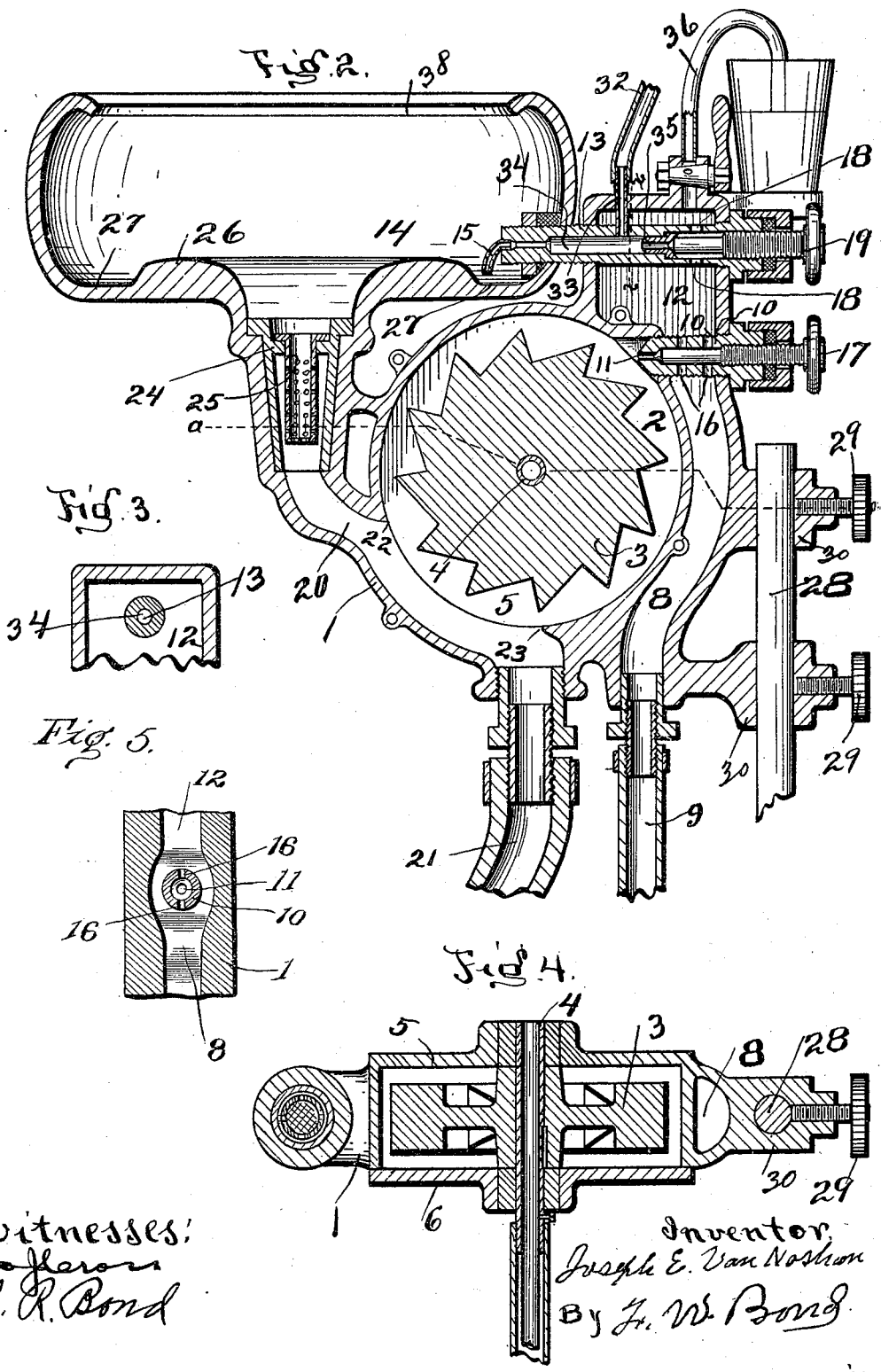

UNITED STATES PATENT OFFICE.

JOSEPH E. VAN NOSTRAN, OF CANTON, OHIO, ASSIGNOR OF ONE-HALF TO JOHN J. HAHN, OF CANTON, OHIO.

COMBINED MOTOR AND CUSPIDOR.

SPECIFICATION forming part of Letters Patent No. 685,069, dated October 22, 1901.

Application filed December 3, 1900. Serial No. 38,443. (No model.)

*To all whom it may concern:*

Be it known that I, JOSEPH E. VAN NOSTRAN, a citizen of the United States, residing at Canton, in the county of Stark and State of Ohio, have invented certain new and useful Improvements in a Combined Motor and Cuspidor; and I do hereby declare that the following is a full, clear, and exact description of the same, reference being had to the annexed drawings, making a part of this specification, and to the figures of reference marked thereon, in which—

Figure 1 is a perspective view showing the different parts properly connected. Fig. 2 is a vertical longitudinal section. Fig. 3 is a transverse section on line x x, Fig. 2. Fig. 4 is a section on line a a, Fig. 2. Fig. 5 is a vertical cross-section of inlet-valve chamber.

The present invention has relation to combined motor and cuspidors designed for use in dentistry, and is to be attached to a dental chair.

Similar numerals of reference indicate corresponding parts in all the figures of the drawings.

In the accompanying drawings, 1 represents the main body, which is provided with the chamber 2, which chamber is for the purpose of holding the motor-wheel 3, which motor-wheel is securely mounted upon the shaft 4, one end of which shaft is properly journaled to the plate 5 and the other end to the cap 6, which cap is connected to the body 1 by means of suitable clamping-bolts 7.

The body 1 is provided with the inlet-passage 8, to which passage is connected in the usual manner the supply-pipe 9, said supply-pipe being extended upward beyond the shaft 4 and at its top or upper end is located the valve-seat 10, said valve-seat being held in proper position by means of suitable screw-threads and is extended into the chamber 2, terminating in a nozzle 11.

Directly above the valve 10 is located the water-chamber 12, through which water-chamber extends the tube 13, said tube being extended through the water-chamber 12 and into the cuspidor 14, as illustrated in Fig. 2, said tube 13 being provided with the nozzle 15, by which arrangement water is supplied to the cuspidor, as hereinafter described.

For the purpose of allowing water to reach the chamber 2 and come into operative contact with the water motor or wheel 3 the passages 16 are formed in the valve-seat 10 so that when the valve 17 is moved outward it will open the passages 16 and permit the water to flow out of the nozzle 11, thereby imparting a rotary movement to the water motor or wheel 3, and when it is desired to cut off the supply of water to the motor the valve 17 is closed; but owing to the valve-seat 10 being formed of a size less than the passage 8 water is permitted to pass around the valve-seat 10 and enter the water-chamber 12 regardless of the position of the valve 17, so that water can be supplied to the cuspidor regardless of the operation of the motor-wheel 3, as hereinafter described.

I prefer to have the water fed to the cuspidor by opening the valve 19, and additional water may be passed through the passage 16.

For the purpose of allowing water to pass from the water-chamber 12 into tube 13 the apertures 18 are provided and are located and formed in the tube 13, it being understood that any desired number of apertures, such as 18, may be employed.

When it is desired to allow water to enter the cuspidor 13, the valve 19 is opened, which allows water to enter from the water-chamber 12 into the tube 13 and find its way to the nozzle 15.

In the drawings I have illustrated the cuspidor 14 formed integrally with the body 1 and said body provided with a waste-passage 20, which waste-passage communicates with the waste-pipe 21, thereby allowing the contents of the cuspidor 14 to be removed through the same pipe that drains or carries off the water after it has acted upon the motor 3.

For the purpose of preventing the water from accumulating in the chamber 2, and thereby interfering with the rotary movement of the motor-wheel 3, the waste-passage 20 opens into the chamber 2 for considerable distance, and, as shown, said opening extends from the point 22 to the point 23, so that an additional or extending waste-chamber is provided or formed.

The cuspidor 14 is provided with the removable tube 24, which is extended downward into the passage 20, said tube being provided with the perforated catch-basin 25, said catch-basin being for the purpose of receiving and holding the fluid that may find its way into the cuspidor.

The bottom or under side of the cuspidor 14 is provided with the ridge 26, upon the outer periphery of which are located the grooves 27, said grooves being for the purpose of holding a certain quantity at all times within the cuspidor.

For the purpose of supporting the motor and cuspidor in proper position the rod or bar 28 is provided and is connected to a dental chair, and upon which rod the motor-frame and cuspidor are clamped by means of set-screws 29, said set-screws being located in the arms 30, said arms being provided with apertures through which the rod or bar 28 passes.

To the shaft 4 of the motor-wheel 3 is connected the flexible shaft 31, said flexible shaft being connected in the usual manner and its free or outer end so constructed that tools of various kinds can be attached, a description of which is unnecessary, inasmuch as that particular part does not enter into the present invention.

For the purpose of removing the saliva from the mouth of the patient the pipe 32 is provided and has attached thereto an ordinary mouthpiece, (not herein shown,) and for the purpose of conveying the saliva to the cuspidor 14 the pipe 33 is connected to the tube 13 in front of the valve 19, and for the purpose of providing a suction a chamber 34, formed in the pipe 13, is larger than the nozzle 35, which nozzle leads into the chamber 34, as illustrated in Fig. 2.

For the purpose of providing a means for supplying fuel-water for any purpose the pipe 36 leads from the water-chamber 2 and is provided with an ordinary cut-off, such as 37.

For the purpose of preventing any splashing the cuspidor 14 is provided with the inturned splashing-flange 38, which splash-flange is located and arranged at the upper part of the cuspidor.

Having fully described my invention, what I claim as new, and desire to secure by Letters Patent, is—

1. A body provided with a chamber having located therein a motor-wheel fixed to a shaft, an inlet-passage located at one side of the chamber containing the motor-wheel, a valve-seat located at the upper end of said inlet-passage extended into the motor-chamber, a water-chamber located above the valve-seat, passages communicating with the inlet-passages and the valve located in the valve-seat, a tube located in the water-chamber and provided with apertures and a valve said tube extended into the cuspidor and the cuspidor located as described and waste-passages leading from the cuspidor and the motor-chamber, substantially as and for the purpose specified.

2. In a combined motor and cuspidor, a frame, a cuspidor fixed thereto, a chamber provided with a motor-wheel, an inlet-passage located at one side of the motor-wheel chamber, a valve and its seat located at the upper end of the inlet-passage, a water-chamber located above the valve and its seat, said water-chamber provided with a tube having perforations, and a valve, said tube extended into the cuspidor, a waste-passage communicating with the waste-passage from the motor-chamber, and an opening located between the cuspidor waste-passage and the motor-chamber waste-passage, substantially as and for the purpose specified.

3. In a combined motor and cuspidor the combination of a body provided with a motor-chamber, a motor located in said chamber and an inlet-passage located at one side of the motor-chamber, a water-chamber located at the upper end of the inlet-passage, a pipe located in the water-chamber said pipe connected in front of the valve located in said pipe, and a nozzle extended into the cuspidor all arranged, substantially as and for the purpose specified.

In testimony that I claim the above I have hereunto subscribed my name in the presence of two witnesses.

JOSEPH E. VAN NOSTRAN.

Witnesses:
J. A. JEFFERS,
F. W. BOND.